United States Patent [19]

Lang

[11] Patent Number: 4,465,392

[45] Date of Patent: Aug. 14, 1984

[54] THERMALLY ISOLATED STRUCTURAL SUPPORT LINK

[75] Inventor: Clifford H. Lang, Long Beach, Calif.

[73] Assignee: The United States of America as represented by the Secretary of the Air Force, Washington, D.C.

[21] Appl. No.: 272,861

[22] Filed: Jun. 12, 1981

[51] Int. Cl.³ .............................................. F16D 1/00
[52] U.S. Cl. ..................................... 403/24; 403/267; 156/60
[58] Field of Search ................. 403/28, 404, 268, 270, 403/42, 24, 267; 74/579 R, 579 F

[56] References Cited

U.S. PATENT DOCUMENTS

| 190,733 | 5/1877 | Blood . |
| 1,983,368 | 12/1934 | Hathorn . |
| 2,405,148 | 8/1946 | Keahey . |
| 2,480,856 | 9/1949 | Henschke et al. . |
| 2,583,382 | 1/1952 | Maas . |
| 2,891,418 | 6/1959 | Smith ................................. 74/579 |
| 2,958,927 | 11/1960 | Kravats . |
| 3,286,547 | 11/1966 | Underup .............................. 74/579 |
| 3,883,256 | 5/1975 | Schmidt ........................ 403/270 X |

FOREIGN PATENT DOCUMENTS 496684 10/1953 Canada ............................... 403/268
527058 5/1931 Fed. Rep. of Germany ........ 74/579

OTHER PUBLICATIONS

Hysol Div., Dexter Corp., Aerospace Adhesives, Bulletin A5-134 A.
Dyflon, Southwest Products Co., Brochure.

Primary Examiner—Thomas F. Callaghan
Attorney, Agent, or Firm—Donald J. Singer; Jacob N. Erlich

[57] ABSTRACT

A thermally isolated structural support link having a tube-like support element, a pair of bearing housings being fixedly secured within each end of the support element, respectively, by an exceptionally strong adhesive, and a spherical monoball bearing affixed within each bearing housing by an exceptionally strong adhesive. Each bearing housing is made of a pair of substantially identical bearing casings which support therebetween the bearing. The tube-like element, bearing housing and adhesive all are made of a material having excellent thermal isolation properties in order to provide not only thermal isolation between components of an assembly but also excellent supportive strength.

9 Claims, 6 Drawing Figures

THERMALLY ISOLATED STRUCTURAL SUPPORT LINK

STATEMENT OF GOVERNMENT INTEREST

The invention described herein may be manufactured and used by or for the Government for governmental purposes without the payment of any royalty thereon.

BACKGROUND OF THE INVENTION

This invention relates generally to support elements, and, more particularly, to a support link which is primarily used for structural support in an environment in which thermal isolation is an essential consideration.

The need for very low temperature cooling is becoming more evident as both missile surveillance and space satellite tracking programs move toward new operational systems. Passive radiators have been used in the past to cool infrared detectors to temperatures on the order of 100° K. These radiators were designed for relatively small heat loads, on the order of a few milliwatts. They were flown on satellites in sun-synchronous or geosynchronous orbits. Viewing requirements for the sensor combined with proximity requirements between the radiator and sensor dictated the need for radiators with conical specularly reflecting shields to minimize incident environmental energy. Contamination of these specular surfaces by condensable materials degraded their performance and required periodic warmup of the surfaces to drive off contaminants.

Development of cryogenic heat pipes made it possible to locate a cyrogenic radiator away from the earth-viewing sensor. In a sun-synchronous or geosynchronous orbit, this means that the radiator can be shielded from any direct solar or earth incident heat flux; hence specularly reflecting surfaces are no longer required. This significantly reduces or eliminates the problem of contamination of cyrogenic radiator coatings.

The remaining obstacle to providing passive cooling for infrared space surveillance systems was temperature. Space surveillance and satellite tracking systems generally require long wavelength infrared (LWIR) systems, which must be operated below 20° K. Even with high-performance multilayer insulation systems, passive radiators were limited to temperatures near or above 100° K. because of parasitic heat leakage from the warm spacecraft to the cold radiator surface. In recent years, however, significant technology advancements in two areas have considerably brightened the outlook for passively cooled IR surveillance systems. The first was in the area of detector technology with the development of hybrid charge coupled device (CCD) detectors, which can be operated in the medium to long wavelength region (8-14 microns) at temperatures in the range of 40° to 70° K. The second advancement was development of the multistage heat-pipe radiator concept. Use of staged radiators in conjunction with cyrogenic heat pipes makes it possible to reject significant heat loads at temperatures as low as 40° K. or below.

The multistage heat pipe radiator concept utilizes two or more radiator stages. Each stage is thermally isolated from the other by multilayer insulation and by support links in order to minimize heat conduction. The principle of performance is based on each radiator stage intercepting the parasitic heat leakage through the insulation below and radiating it to space such that each successive stage sees a colder and colder boundary temperature. This process allows each successive stage to attain lower and lower temperatures. The intermediate stages can also provide heat rejection at intermediate temperature levels to cool other elements of a system such as optics, baffles, and electronics. Heat pipes transport heat from the heat source to the radiator and distribute it over the radiator surface to increase overall fin efficiency.

It is therefore essential in the future development of multistage heat pipe radiators to be able to minimize heat transfer between stages. A need therefore arises to devise structural support elements or links which are capable of not only providing sufficient structural support for such multistage heat pipe radiators but also providing the required thermal isolation between stages.

SUMMARY OF THE INVENTION

The instant invention overcomes the problems encountered in the past by providing a structural support link which provides not only structural support but also thermal isolation between component assemblies. An example of such an assembly would be the stages of a heat pipe radiator with a high strength axial load path.

The structural support link of this invention is made up of an epoxy glass or fiberglass tube, a pair of epoxy glass or fiberglass bearing housings, and each housing supporting therein a spherical monoball bearing. In an alternate embodiment of this invention one of the epoxy glass or fiberglass bearing housings may be replaced with a threaded connector. The housings are inserted within the ends of the tube to which it is bonded. The epoxy glass tube provides high axial strength combined with low thermal conductance. The monoball bearings essentially eliminate shear or bending loads on the tube and allow for relative movement between radiator stages resulting from differential thermal contraction. Depending on the usage of the structural support links of this invention, the planes of the rod-end bearings may be situated either parallel to each other, at 90° to each other or in some instances one of the rod-end bearings may be substituted for by a threaded coupler.

Although the structural support link of this invention finds its main and preferable usage within the multistage heat pipe radiator, it may be used in any structural application where thermal isolation and structural support is necessary.

It is therefore an object of this invention to provide a structural support link having excellent load carrying capablities.

It is another object of this invention to provide a structural support link which has very high resistance to heat flow.

It is a further object of this invention to provide a structural support link which will accommodate large displacements due to thermal shrink differentials between structural elements.

It is still a further object of this invention to provide a thermally isolated structural support link which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENTS

Figure 1:
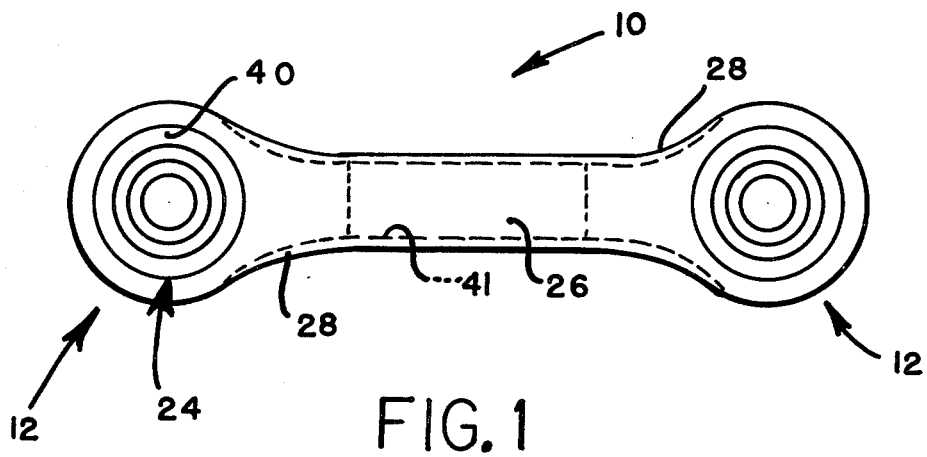
FIG. 1 is a pictorial representation of the thermally isolated structural support link of this invention.
Figure 3:
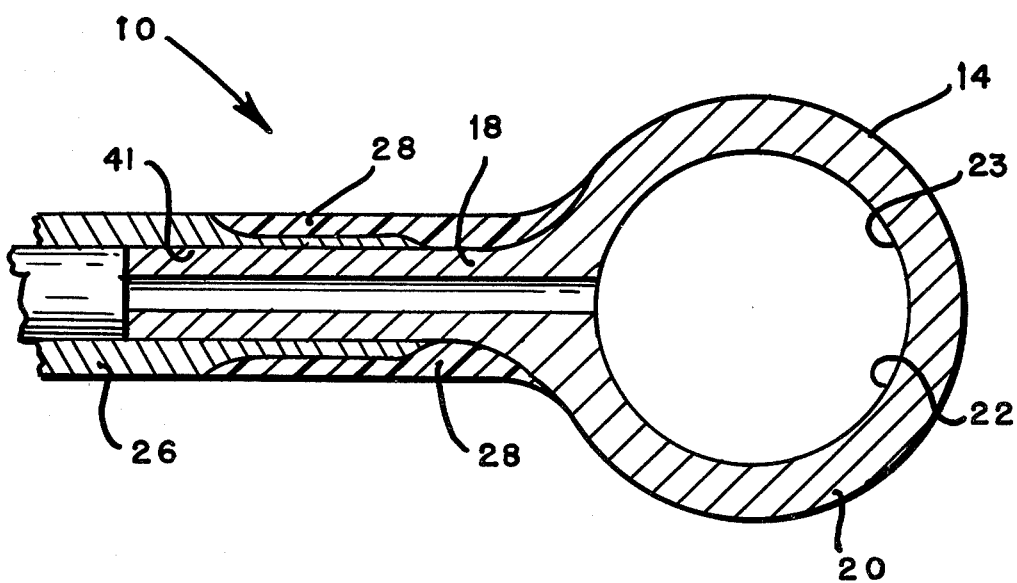
FIG. 3 represents a segmented plan view, illustrating the components of the thermally isolated structural support link of this invention and shown partly in cross section.
Figure 2:
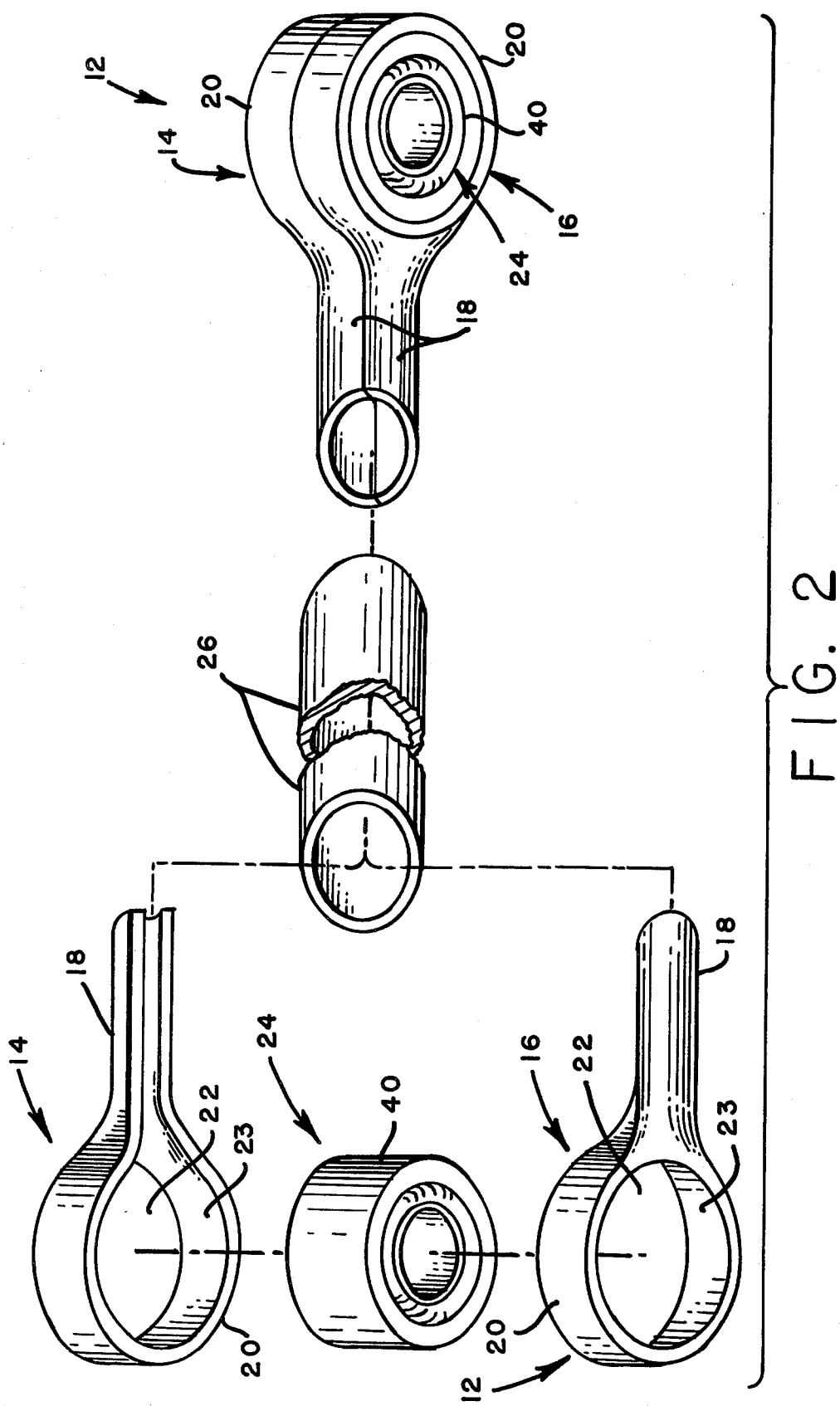
FIG. 2 is a pictorial representation, shown in exploded fashion, of the thermally isolated structural support link of this invention.

Reference is now made to FIG. 1 of the drawing which pictorially represents the thermally isolated structural support link 10 of this invention. The components which make up the support link 10 of this invention are clearly depicted in FIGS. 2 and 3 of the drawing. As shown in the above mentioned Figures, each support link 10 is made of seven major components plus an assembly bond of epoxy glass material.

At each end of the support link 10 is located a bearing housing 12. Each bearing housing 12 is formed of a pair of bearing casings 14 and 16 of identical configuration. Each bearing casing is made up of a semi-cylindrically-shaped hollow rod 18 formed at one end thereof and a bearing mount 20 formed at the other end thereof. It is essential that the material making up casings 14 and 16 have excellent thermal isolation properties in addition to providing excellent structural support. Consequently, a material such as epoxy glass or fiberglass must be used with this invention. Each bearing mount 20 has a centrally located opening 22 therein surrounded by a smooth surface 23 to which is bonded the outer surface of a conventional spherical monoball bearing 24 of the type produced by Southwest Products Corporation of Monrovia, Calif.

Bearing casings 14 and 16 are positioned and aligned on bearing 24 which has been coated on its outer circumferential surface 40 with an adhesive or bonding material such as epoxy structural adhesive, thus forming rod end assembly 12. An example of such an adhesive would be EA934, manufactured by the HYSOL Division of Dexter Corporation of California as No. EA934. Thereafter, cylindrical end 18 of assembly 12 is similarly coated with epoxy adhesive and fitted into tubular elements 26, bonding thereto at surface 41. Tubular element 26, fabricated from any suitable thermally isolative material such as epoxy or fiberglass, is cut to size for the specific application. Its inside diameter must be approximately 0.020 inches greater than the outer diameter of rod end 18 to allow proper bond of the two elements. Once rod ends 18 are bonded to tubular element 26, any suitable combination of glass fiber filament and epoxy bond material (the combination, as installed, referred to as securement means 28, see FIG. 3) may be utilized to support bearing housing 12 to tubular element 26. Subsequent curing of the components of link 10 provides a rigid, structurally sound support element. Of particular importance in the invention is the orientation of fiberglass filaments in bearing casings 14 and 16 and tube 26. The filaments must be arranged and orientated to provide optimal load carrying capability as well as to inhibit heat conduction.

Figure 4:
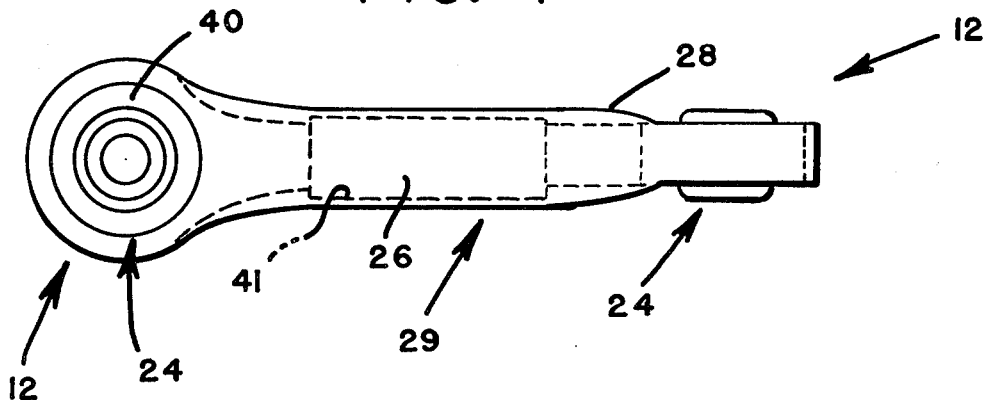
FIG. 4 is a pictorial representation of an alternative emdobiment of the thermally isolated structural support link of this invention.
Figure 5:
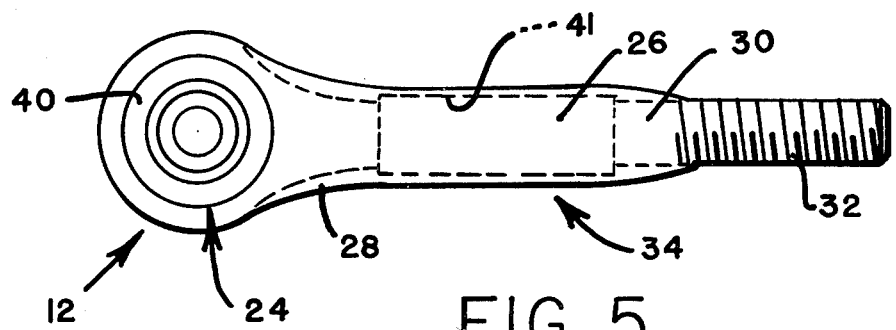
FIG. 5 is a pictorial representation of another alternate embodiment of the thermally isolated structural support link of this invention.

Generally the thermally isolated structural support link 10 of this invention is produced having the plane of each bearing housing 12 lying in the same plane as illustrated in FIG. 1 of the drawing. It may, however, be necessary in some instances to preadjust the position of bearing housings 12 prior to bonding such that the planes of the spherical bearings are at right angles with respect to one another as illustrated by support link 29 in an alternate embodiment of this invention shown in FIG. 4 of the drawing. Furthermore, in some instances one of bearing housings 12 may be eliminated and replaced by a link 30 inserted within tube 26. In this instance link 30 has a threaded end 32 thereon. This type of structural support link 34 is clearly depicted in FIG. 5 of the drawing.

Figure 6:
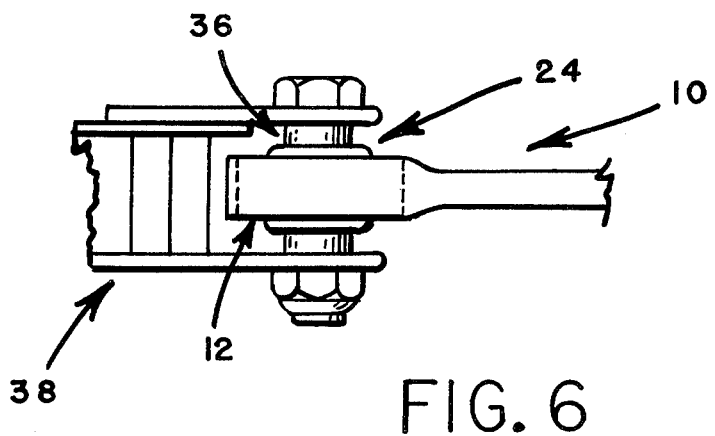
FIG. 6 is a side elevational view showing the thermally isolated structural support link of this invention in use.

FIG. 6 of the drawing is illustrative of the utilization of a structural link 10 of this invention in which a spherical bearing 24 thereof is interconnected to a suitable bolt arrangement 36 which may form, for example, part of a multistage heat pipe radiator 38 of the type described within the background of this invention. By utilizing the structural support link 10 of this invention it is possible to provide high axial strength combined with extremely low thermal conductance and solve a problem heretofore encountered in the manufacture of, for example, multistage heat pipe radiators. Furthermore, the rod-end bearings essentially eliminate shear or bending loads on tube 26 while further allowing for relative movement between stages resulting from differential thermal contraction.

Although this invention has been described with reference to particular embodiments, it will be understood to those skilled in the art that this invention is also capable of further and other embodiments within the spirit and scope of the appended claims.

I claim:

1. A thermally isolated structural support link comprising a tube-like support element having a hollow interior, at least one bearing housing, said bearing housing being made of a pair of casings, each of said bearing casings being formed of substantially identical configurations and having a semi-cylindrically-shaped rod at one end thereof and a bearing mount at the other end thereof, a spherical monoball bearing being interposed between said bearing mounts and affixed therebetween by an extremely strong adhesive, said semi-cylindrically-shaped rods being secured together to form a cylindrically-shaped rod, said cylindrically-shaped rod being positioned within one end of said hollow tube-like support element and affixed therein by an extremely strong adhesive, and said tube-like element, said bearing housing and said adhesive being made of a material having excellent thermal isolation properties whereby said support link is capable of thermally isolating as well as structurally interconnecting together the components of an assembly.

2. A thermally isolated structural support link as defined in claim 1 comprising another bearing housing affixed within the other end of said support element, said other bearing housing being identical in makeup and configuration to said one bearing housing.

3. A thermally isolated structural support link as defined in claim 2 wherein said one bearing housing lies in the same plane as said other bearing housing.

4. A thermally isolated structural support link as defined in claim 2 wherein said one bearing housing lies in a plane perpendicular to the plane of said other bearing housing.

5. A thermally isolated structural support link as defined in claim 2 wherein said tube-like element and said bearing housing are made of an epoxy glass material.

6. A thermally isolated structural support link as defined in claim 2 wherein said tube-like element and said bearing housing are made of fiberglass.

7. A thermally isolated structural support link as defined in claim 2 wherein said adhesive is made of an epoxy material.

8. A thermally isolated structural support link as defined in claim 1 further comprising a rod having a threaded end portion thereon, said rod being positioned within the other end of said hollow, tube-like element and affixed therein by an extremely strong adhesive.

9. In a heat pipe radiator having a plurality of stages and at least one of said stages having a bolt arrangement therein, the improvement therein being in the form of at least one thermally isolated structural support link, said support link comprising a tube-like support element having a hollow interior, at least one bearing housing, said bearing housing being made of a pair of casings, each of said bearing casings being formed of substantially identical configurations and having a semi-cylindrically-shaped rod at one end thereof and a bearing mount at the other end thereof, a spherical monoball bearing being interposed between said bearing mounts and affixed therebetween by an extremely strong adhesive, said semi-cylindrically-shaped rods being secured together to form a cylindrically-shaped rod, said cylindrically-shaped rod being positioned within one end of said hollow tube-like support element and affixed therein by an extremely strong adhesive, and said tube-like element, said bearing housing and said adhesive being made of a material having excellent thermal isolation properties whereby said support link is capable of thermally isolating as well as structurally interconnecting together said stages of said heat pipe radiator.

* * * * *